United States Patent [19]
Brooks

[11] 4,257,691
[45] Mar. 24, 1981

[54] LINE OF SIGHT DISPLAY APPARATUS

[76] Inventor: Philip A. Brooks, 436 NW. 46th Ter., Oklahoma City, Okla. 73118

[21] Appl. No.: 1,219

[22] Filed: Jan. 5, 1979

[51] Int. Cl.² .............................................. G02B 1/24
[52] U.S. Cl. ................... 351/158; 40/15 R; 350/145; 350/173
[58] Field of Search .............. 351/41, 51, 158; 350/319, 351, 96.24, 150, 112, 145, 182, 185, 214, 220, 173; 46/15 R; D34/15; 40/15, 448, 619, 586, 46; 128/25; D57/1; 30/225

[56] References Cited

U.S. PATENT DOCUMENTS

| | | | |
|---|---|---|---|
| 560,418 | 5/1896 | Lorenz | 351/41 |
| 2,064,963 | 12/1936 | Wheeler | 350/319 |
| 2,352,644 | 5/1944 | Linderman et al. | 350/2.3 |
| 2,557,663 | 6/1951 | Knode | 40/586 |
| 2,860,544 | 11/1958 | Kahn | 350/74 |
| 2,920,134 | 1/1960 | Dresser | 178/5.8 |
| 2,926,559 | 3/1960 | Oppenheimer | 350/16 |
| 3,060,308 | 10/1962 | Fortuna | 240/6.4 |
| 3,245,315 | 4/1966 | Marks et al. | 350/160 LC |
| 3,418,737 | 12/1968 | Lambert | 40/492 |
| 3,712,714 | 1/1973 | Uyeda et al. | 350/301 |
| 3,873,804 | 3/1975 | Gordon | 219/147 |
| 4,021,935 | 5/1977 | Witt | 35/12 G |
| 4,039,803 | 8/1977 | Harsh | 350/160 LC |
| 4,071,912 | 2/1978 | Bridmiger | 2/8 |
| 4,154,513 | 5/1979 | Goulden | 351/41 |

FOREIGN PATENT DOCUMENTS

2658106 7/1968 Fed. Rep. of Germany .......... 351/158

Primary Examiner—John K. Corbin
Assistant Examiner—B. Wm. de los Reyes
Attorney, Agent, or Firm—Head & Johnson

[57] ABSTRACT

An apparatus for providing a display of information or a source of light to a viewer or an object along the line of sight between a user of the apparatus and the viewer or object without preventing the user's normal vision. The apparatus generally includes an element which provides visible images to the viewer, a member which blocks the visible image from the user, and an activating device which provides oscillating activation signals to the imaging element and the blocking member. The apparatus may also include prisms associated with each other to reflect certain images or light to the viewer or object.

16 Claims, 13 Drawing Figures

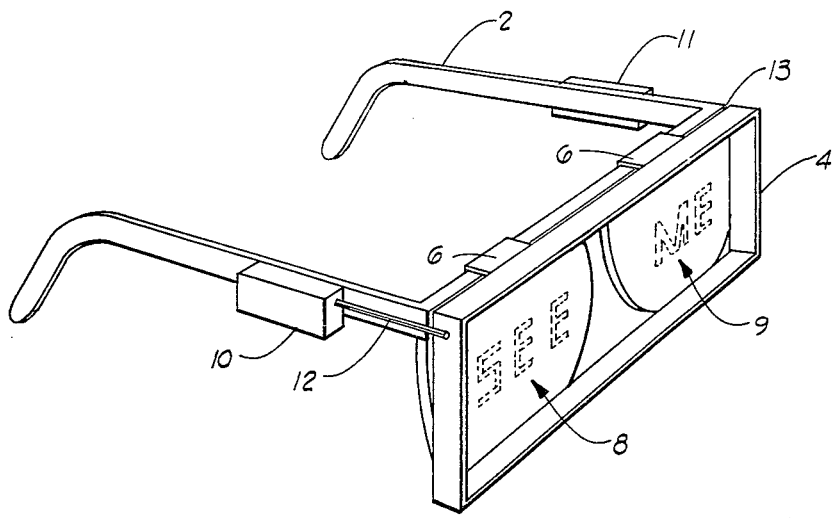
FIG. 1
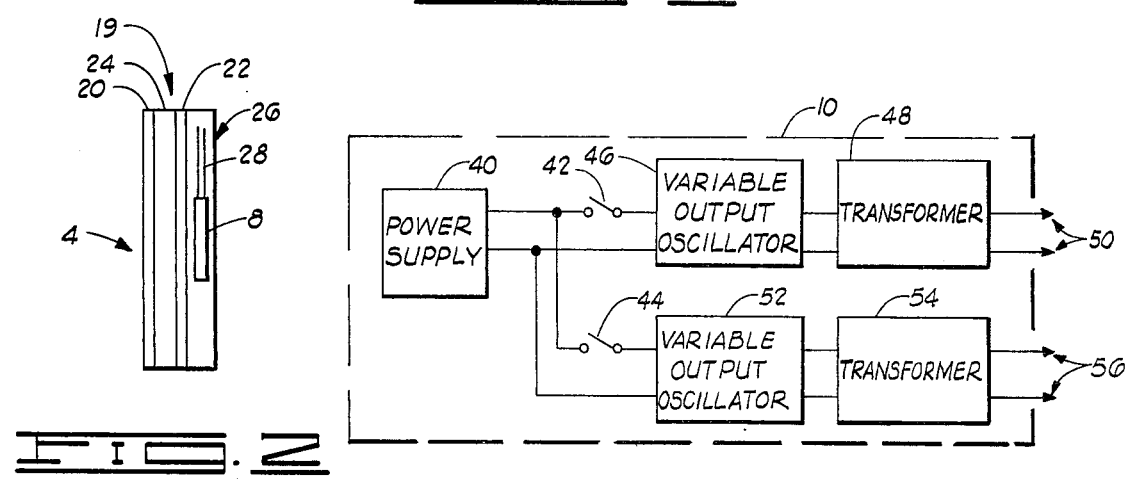
FIG. 2
FIG. 3
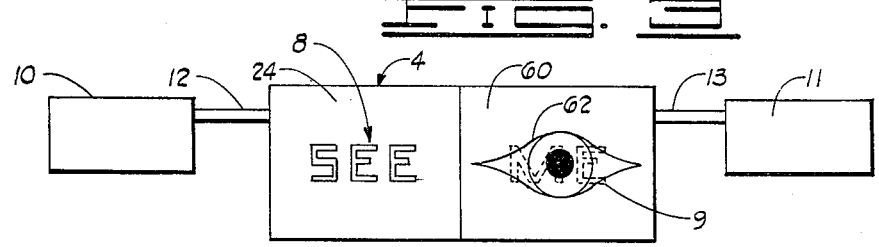
FIG. 4A
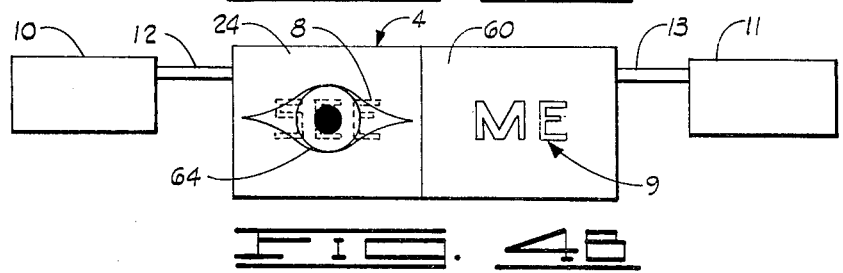
FIG. 4B

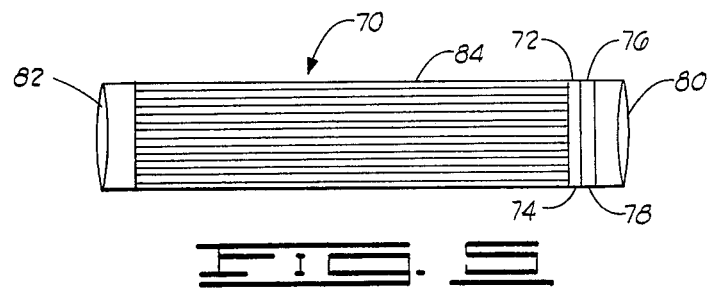
FIG. 5
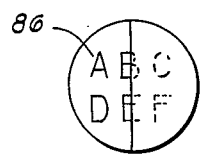 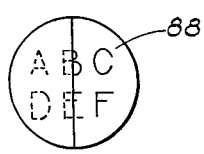
FIG. 6A    FIG. 6B
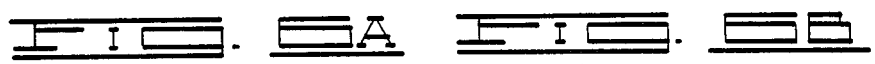
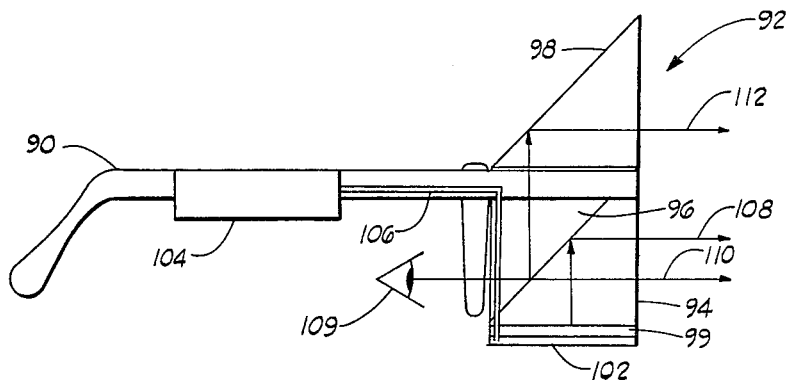
FIG. 7
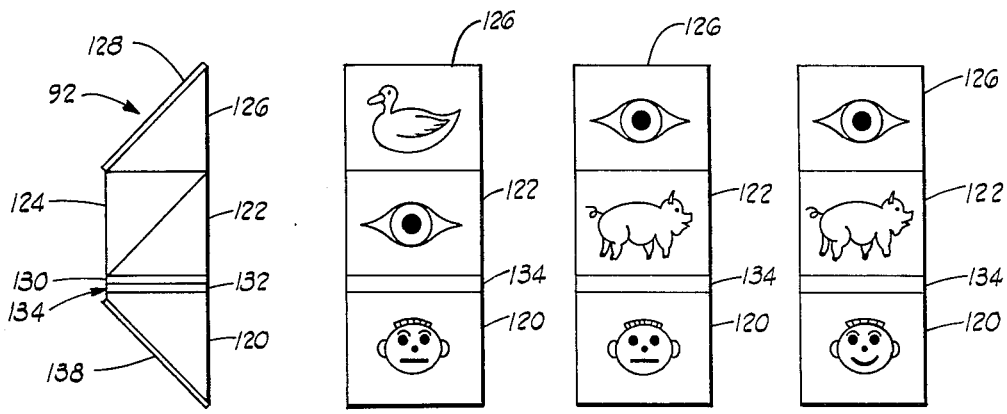
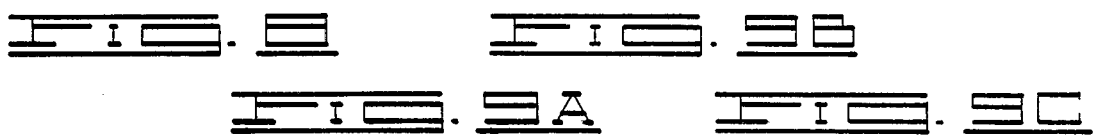
FIG. 8    FIG. 9B
FIG. 9A    FIG. 9C

LINE OF SIGHT DISPLAY APPARATUS

BACKGROUND OF THE INVENTION

1. Field of the Invention

This invention relates generally to apparatus for displaying visible light to a viewer while retarding a displayer's perception of the displayed light. More particularly, but not by way of limitation, this invention relates to apparatus for displaying information which is placed on the line of sight between the viewer and the displayer.

2. Description of the Prior Art (Prior Art Statement)

The following statement is intended to be a Prior Art Statement in compliance with the guidance and requirements of 37 C.F.R. Sections 1.56, 1.97 and 1.98.

U.S. Pat. No. 2,352,644 issued to Linderman, Jr., et al. discloses an apparatus for estimating ranges which proposes right triangular prisms joined along their hypotenuse sides and containing an image applied to the top surface of the resultant cube.

U.S. Pat. No. 2,860,544 issued to Kahn proposes a viewing device having a vertical display area physically offset from the viewer's line of sight and further having mirrors to display material to the viewer.

U.S. Pat. No. 2,920,134 issued to Dresser discloses a cueboard and spot projection for electronic picture taking. This includes a cue indicator which operates during "blind" periods of a picture tube thereby permitting the cued material to appear visible to a direct viewer thereof through persistence of vision, but does not permit it to be visible to the camera containing the picture tube.

U.S. Pat. No. 2,926,559 issued to Oppenheimer discloses a prompting apparatus for cameras which includes reflecting means for reflecting material to be read by a reader onto the line between the reader and the lens of the camera.

U.S. Pat. No. 3,060,308 issued to Fortuna discloses an illuminated optical device. In particular this device includes spectacles which have light sources disposed above the lenses.

U.S. Pat. No. 3,245,315 issued to Marks et al. discloses an electro-optic responsive flashblindness controlling device having crystal layers between transparent conductive coatings and also having polarizers associated with the crystal layers. These elements are incorporated into a pair of glasses which includes a photocell and power supply for activating the crystal layers to become opaque to prevent flashblindness.

U.S. Pat. No. 3,712,714 issued to Uyeda et al. discloses an information display for a diver's face mask. This is proposed to include an information display means mounted to the mask out of the diver's normal line of sight. The display means is reflected by appropriate means to be visible to the diver upon the shifting of his eyes to the proper location.

U.S. Pat. No. 3,873,804 issued to Gordon proposes a welding helmet with eye piece control having a liquid crystal member incorporated into the protective welding lens. The liquid crystal member is activated by electrical energy to control the opacity of the liquid crystal as a result of the welding activity.

U.S. Pat. No. 4,021,935 issued to Witt discloses a flight training hood which has a liquid crystal viewing lens whose opacity is controllable to occlude the wearer's vision.

U.S. Pat. No. 4,039,803 issued to Harsch discloses an electro-optic welding helmet lens assembly which has a liquid crystal light shutter responsive to infra-red and visible light energy.

U.S. Pat. No. 4,071,912 issued to Budmiger discloses a light filter for a welder's mask having ceramic crystals or fluid crystals between transparent electrodes. The opacity of the welder's mask is triggered by an activator circuit responsive to sound or light.

As shown by the above-mentioned disclosures, there is a need for an apparatus which can respond to certain stimuli to occlude unwanted light from the user's eyes. However, there is the additional need to have such a responsive apparatus which occludes certain light for certain purposes yet which does not substantially adversely affect normal vision. There is also the need for data display glasses which provide visible information to a viewer from the eye region of the displayer without substantially adversely affecting the displayer's vision and without displaying the information to the displayer. An additional need is to provide a direct source of light along the line of sight between the viewer and the subject to be examined. Still further there is the need for variably controlled sunglasses. Also there is a need for security panels which provide uni-directional vision therethrough.

The previous disclosures, however, do not propose apparatus which meet these needs. These references fail to indicate apparatus which display information or provide illumination directly along the line of sight between the apparatus users and viewers. Still further the prior references fail to show the combination of frequency responsive occluding elements with frequency responsive illumination elements. Therefore, Applicant believes that no previously disclosed device which is known to him indicates, either singly or in combination, the present invention.

SUMMARY OF THE INVENTION

The present invention overcomes the above-noted and other shortcomings of the prior art by providing a novel and improved line of sight display apparatus. This display apparatus provides line of sight display or illumination to a viewer or subject while occluding the display or illumination from the user without substantially adversely affecting such user's normal vision.

In particular, the present invention provides data display glasses for use in advertising, for example. Additionally, the present invention provides an eye-level light-emitting lens system to provide illumination along the user's line of sight. Still further the present invention fulfills the need for variably controlled sunglasses and also for security panels which only permit uni-directional vision therethrough.

Structurally, one embodiment of the line of sight display apparatus of the present invention includes imaging means and blocking means placed along the line of sight of a displayer who is wearing the apparatus. The blocking means is placed closer to the eyes of the displayer to shield the imaging means from the displayer when the imaging means is being activated by an activating means which is associated with both the imaging means and the blocking means.

The blocking means includes two occluding members which are associated with the activating means so that each occluding member is alternately activated. Similarly, the imaging means has two displaying members which are alternately activated by the activating means.

One of the two occluding members is associated with a respective one of the displaying members to form a first pair of members which is associated with one of the displayer's eyes. Likewise, the remaining members form a second pair which is associated with the other eye of the displayer.

Each of these pairs of members is associated with a respective first and second connection from the activating means. It is through these connections that the alternating activation is provided to each pair. Although each pair is activated at a different time from the other pair, the members comprising each pair are simultaneously activated so that the occluding member prevents the light from the displaying member from being observed by the displayer.

More specifically, the occluding members of the blocking means may be ferroelectric ceramic or liquid crystal layers, or substances similar thereto which are frequency responsive. Likewise, the display members are to be frequency responsive elements such as neon, xenon or mercury vapor gas light tubes.

Another embodiment of the present invention is an optical device which can illuminate a subject by means of an illuminating means placed along the line of sight of the viewer. Associated with this illuminating means is a blocking means which is the same as the blocking means of the previous embodiment and which is positioned between the illuminating means and the viewer so that the illuminating means may be blocked from the viewer's vision during the activation of the illuminating means. This period of activation is provided by an activating means associated with both the illuminating means and the blocking means for periodically activating them.

This optical device further includes a fiber optic member connected to the illuminating means/blocking means combination so that the entire fiber optic member can be used both as an illumination source and as an image transmitting device.

Still another embodiment of the present invention is a head gear which includes a support member, a display member and an image member. The image member is removably attached adjacent one of the sides of the display member. The display member is connected to the support member to overlay the wearer's eyes. The display member includes the combination of right triangular prisms joined to display a variety of images to the viewer.

From the foregoing it is a general object of the present invention to provide a novel and improved line of sight display apparatus. Other and further objects, features and advantages of the present invention will be readily apparent to those skilled in the art upon a reading of the description of the preferred embodiments, which follow, when taken in conjunction with the accompanying drawings.

BRIEF DESCRIPTION OF THE DRAWINGS

FIG. 1 is a perspective view of one of the embodiments of the present invention in its unactivated state.

FIG. 2 is a side elevation view of the display apparatus of FIG. 1.

FIG. 3 is a functional block diagram of the activating means of FIG. 1.

FIG. 4a is a schematic illustration of the FIG. 1 embodiment at one instant of activation.

FIG. 4b is a schematic illustration of the FIG. 1 embodiment at a time of activation different than that of FIG. 4a.

FIG. 5 is a top plan view of another embodiment of the present invention.

FIG. 6a is an end elevation view of the FIG. 5 embodiment at one moment of activation. FIG. 6b is an end elevation view of the FIG. 5 embodiment at a time different than that of FIG. 6a.

FIG. 7 is a side elevation view of another embodiment of the present invention.

FIG. 8 is another embodiment of the display member of FIG. 7.

FIG. 9a is a front elevation view of the FIG. 8 embodiment when viewed along a line of sight below a line perpendicular to the front elevation.

FIG. 9b is a front elevation view of the FIG. 8 embodiment viewed along a line perpendicular to the front elevation.

FIG. 9c is a front elevation view of the FIG. 8 embodiment viewed along a line above a line perpendicular to the front elevation.

DETAILED DESCRIPTION OF PREFERRED EMBODIMENTS OF THE INVENTION

Referring now to the drawings and particularly to FIG. 1, a preferred embodiment of the present invention is shown in combination with a pair of eyeglasses 2. Attached to the glasses 2 is a display apparatus 4. The attachment is by means of a pair of connectors 6. Contained within the display apparatus 4 are displaying members 8 and 9.

Also connected to the glasses 2 are activating means 10 and 11 which are further connected to the display apparatus 4 and the displaying members 8 and 9 by connections 12 and 13, respectively.

The displaying members 8 and 9 are shown in FIG. 1 in phantom to show that they are in an unactivated state, that is, they are substantially invisible to both the displayer, or wearer of the eyeglasses 2, and an external viewer since the displaying members 8 and 9 are transparent when in their unactivated state.

Referring now to FIG. 2, the component parts of the display apparatus 4 are shown. Generally, the display apparatus 4 includes a blocking means 19, having polarizers 20 and 22 and an occluding member 24, and an imaging means 26, having the displaying members 8 and 9 and a plurality of leads 28 which extend from the display members 8 and 9 to the connections 12 and 13 shown in FIG. 1. The blocking means 19 is periodically activated by the activating means 10 or 11 shield the eyes of the displayer from the light of the imaging means 26 which is simultaneously activated by the activating means 10 or 11.

The occluding member 24 is a frequency responsive member which can be made of, for example, ferroelectric ceramics or liquid crystals. Applicant has empirically discovered that when activating ferroelectric ceramic layers at 30 Hz., the wearer of the display apparatus retains a reading capability.

Similarly, the displaying members 8 and 9 are frequency responsive display devices which can be, for example, gas-filled tubes having neon, xenon or mercury vapor as their constituent element.

In FIG. 3 a functional block diagram of one embodiment of the activating means 10 is shown. Activating means 11 is similar. Supplying power to the display apparatus 4 is a power supply 40 which is connectable to the remainder of the circuits via switches 42 and 44.

Connected through switch 42 is a variable output oscillator 46 which is controllable to supply an output to a transformer 48. Extending from the transformer 48 are outputs 50 which connect to the connection 12.

Connected to the power supply 40 through the switch 44 is a variable output oscillator 52 which provides an output to a transformer 54. From the transformer 54 outputs 56 also connect to the connection 12.

In particular, the transformer 48 in one embodiment converts the output from the variable output oscillator 46 to a voltage level of approximately 200 volts to activate a neon gas-filled tube of the displaying member 8. Similarly, the transformer 54 converts the output from the variable output oscillator 52 to a voltage level of approximately 850 volts to activate the occluding member 24.

FIGS. 4a and 4b illustrate one sequence of operation of a preferred embodiment of the present invention. FIG. 4a shows the display apparatus 4 along with the activating means 10 and 11 and the connections 12 and 13. The displaying member 8 is shown to be in its activated state as indicated by the solidly drawn lines of the letters of the word "SEE". Furthermore, the occluding member 24 is shown as being activated so that the displayer's right eye is not visible to the viewer. However, an occluding member 60 similar to the occluding member 24 is unactivated as depicted by the displayer's left eye 62 being visible to the viewer.

The FIG. 4a illustration is derived when the activating means 10 provides activation signals via the connection 12 to the occluding member 24 and the displaying member 8. By providing such signals, the occluding member 24 becomes opaque thus occluding the light from the activated displaying member 8 from the displayer's right eye. However, at the same time, the activating means 11 provides no signal to the occluding member 60, thus leaving the occluding member 60 clear and permitting vision therethrough to the displayer.

A short time later, the activating means 10 ceases activation of the occluding member 24 and the displaying member 8, and the activating means 11 provides activation signals via the connection 13 to the occluding member 60 and the displaying member 9, as shown in FIG. 4b. Thus, at this instant of time, the occluding member 60 occludes the light from the displaying member 9 from the displayer's left eye. On the other hand, the unactivated occluding member 24 permits the displayer's right eye 64 to see beyond the display apparatus 4.

Through this alternating activation procedure resulting from the oscillating signals from the activating means 10 and 11, the displayer/wearer of the display apparatus 4 retains substantially normal vision. However, through the phenomenon of persistence of vision the viewer retains the total image of the displayed material presented by the display members 8 and 9, that is, in the FIG. 4a and 4b example the viewer sees the words "SEE ME" and not the displayer's eyes. It is to be noted that this total image can be activated to appear as a blinking or highlighted display through further control of the activation signals supplied to the display members.

By varying the structure of the displaying members 8 and 9 to fully cover the surface area of the display apparatus 4, it is apparent that the display apparatus 4 could be used by itself as a security panel which would permit vision in one direction (i.e., vision from the side having the blocking means), yet prevent vision in the opposite direction (i.e., no vision from the side having the imaging means) because of the viewer's persistence of vision of seeing the displaying members 8 and 9. This type of security panel is advantageous because the person using the security panel does not need to be in a dark room. Such person can have his own light source and still not be seen by those on the other side of the panel.

Additionally, it is apparent that the side by side alternating scheme could be changed to, for example, a vertically alternating scheme. Also, a single displaying member/occluding member system could be effected to provide voltage and frequency controlled sunglasses.

Furthermore, the displaying members may be placed between the wearer and the occluding members, and these members may be controlled by radio signals, for example. In this manner a message or signal can be activated for detection by the wearer alone.

In FIG. 5, a second embodiment of the present invention is disclosed as an optical device 70. The optical device 70 includes lighting members 72 and 74 which together form an illuminating means. Disposed adjacent the lighting members 72 and 74 closer to the viewing end of the optical device 70 are obscuring members 76 and 78. Disposed further toward the viewing end is a lens 80. At the opposite end of the optical device 70 is a lens 82. Connected intermediate the lighting members 72 and 74 and the lens 82 is a fiber optic member 84 which may be a fiber scope which transmits light through flexible light guides. Although not shown in FIG. 5, the optical device further includes an activating means which is similar to the one shown in the FIG. 1 embodiment and which is connected to the lighting members 72 and 74 and the obscuring members 76 and 78.

The lighting members 72 and 74 and the obscuring members 76 and 78 operate in the same manner as the displaying members and occluding members of the FIG. 1 embodiment as shown in FIGS. 6a and 6b. In FIG. 6a the lighting member 72 and the obscuring member 76 are activated so that only the left half of the fiber scope is displaying an image 86 to the viewer. In FIG. 6b the lighting member 74 and the obscuring member 78 are activated so that an image 88 is displayed by the right half of the fiber member 84. Although only the left or right half of the whole area to be viewed is actually visible to the viewer at any one moment, the viewer retains a view of the whole image because of persistence of vision.

Such an embodiment as shown in FIG. 5 is useful in such devices as a bronchoscope or an ophthalmoscope wherein the entire fiber optic member is used to transmit both light and image. By using the present invention, therefore, light is provided on a direct line of sight path. It is to be noted that the direct source of light can also be placed adjacent the object to be viewed by positioning the lighting members 72 and 74 at the end of the optical device 70 between the lens 82 and the fiber optic member 84.

Still another embodiment of the present invention is disclosed in FIG. 7 which shows a head gear 90, such as spectacles, used as a support member for supporting a display member 92. The display member includes right triangular prisms 94, 96 and 98. Prisms 94 and 96 are joined along their hypotenuse sides. One perpendicular side of the prism 98 is connected to one perpendicular side of the prism 96 so that the hypotenuse side of the prism 98 is parallel to the joined hypotenuse sides of the prisms 94 and 96.

Connected to the perpendicular side of the prism 94 opposite the perpendicular side of the prism 96 which is joined to the prism 98 is an image member 99 which may be a removable slide containing a picture to be displayed through the display member 92. Image member 99 may also be a lens for focusing an illumination means 102 which is connected below the image member 99 and which includes a light for illuminating the image member 99. The illuminating means 102 is energized by an activating means 104 through electrically conducting leads 106.

When used along the proper display angle, the display member 92 reflects an image from the image member 99 along the direction indicated by arrow 108 to a viewer. Although this image blocks the viewer's vision through the display member 92, it does not prevent a user 109 from seeing out as indicated by the arrows 110 and 112.

Referring now to FIG. 8, another embodiment of the display member 92 is shown. This embodiment includes right triangular prisms 120, 122, 124 and 126. The prisms 122 and 124 are joined along their hypotenuse sides to form a cube. One perpendicular side of the prism 126 is joined to a perpendicular side of the prism 124 such that the hypotenuse side of the prism 126 is parallel to the joined hypotenuse sides of the prisms 122 and 124. Associated with the hypotenuse side of the prism 126 is an image member 128. Associated along the perpendicular leg of the prism 122 opposite the joined sides of the prisms 124 and 126 are image members 130 and 132. These image members 130 and 132 are enclosed in a housing 134 which is connected to the side of the prism 122. Connected to this housing 134 is the perpendicular side of the prism 120 which establishes the hypotenuse side of the prism 120 perpendicular to the joined hypotenuse sides of the prisms 122 and 124. Associated with the hypotenuse side of the prism 120 is an image member 138.

Referring now to FIGS. 9a, 9b and 9c, the various displays obtainable from the FIG. 8 embodiment are shown. FIG. 9a shows from top to bottom the image member 128, the wearer's eye, and the image member 132. This display is obtained by viewing the display member along a line which is below a line perpendicular to the front viewing surface of the prism 122 shown in FIGS. 9a-9c.

FIG. 9b shows the display seen by a viewer viewing the display member 92 from a line perpendicular to the front viewing surface of the prism 122. At the top is the wearer's eye, in the middle is the image member 130, at the bottom is the image member 132.

FIG. 9c shows the display visible to a viewer viewing the display member 92 from a line above the perpendicular. Such display includes from top to bottom the wearer's eye, the image member 130, and the image member 138.

To minimize the visibility of the wearer's eye in the embodiment shown in FIGS. 9a-9c, a reflective drawing can be placed on the prism 124 surface adjacent the wearer's eye. This reflective drawing has a plurality of small clearances to permit the wearer to see therethrough; yet, the drawing, instead of the wearer's eye, is reflected to be visible to the viewer.

The above-described embodiments describe apparatus which provide a display to viewers and illumination to objects to be observed by the user without substantially impairing the user's normal vision. In this way messages can be broadcast, light for critical viewing in such circumstances as dental or other medical work can be obtained, and security from harsh sunlight or unwanted viewer inspection is obtained. Regardless of the specific case, however, the invention described herein provides novel and improved light and data display apparatus. Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A line of sight display apparatus for displaying visually perceptible matter by a displayer to a viewer while obscuring said displayed matter from the sight of said displayer without preventing normal vision by said displayer, comprising:
   light-emitting imaging means disposed along the line of sight of said displayer between said viewer and said displayer for providing said visually perceptible matter;
   blocking means disposed along the line of sight of said displayer between said imaging means and said displayer for providing an obscuring shield to prevent the observation of said visually perceptible matter by said displayer when said imaging means is providing said visually perceptible matter; and
   electrical activating means associated with said imaging means and said blocking means for periodically electrically activating said imaging means to provide said visually perceptible matter and for simultaneously periodically electrically activating said blocking means to provide said obscuring shield.

2. The display apparatus recited in claim 1, wherein said blocking means includes two occluding members associated with said activating means for being electrically activated thereby at differing times.

3. The display apparatus recited in claim 2, wherein:
   said imaging means includes two displaying members associated with said activating means for being electrically activated thereby at differing times, a first one of said displaying members being associated with one eye of said displayer and a second one of said displaying members being associated with the other eye of said displayer;
   said occluding members include a first member associated with said first one of said displaying members and a second member associated with said second one of said displaying members; and
   said activating means includes a first electrical connection associated with said first displaying member and said first occluding member for providing simultaneous activation thereof and a second electrical connection associated with said second displaying member and said second occluding member for providing simultaneous activation thereof at a time different from the time said first connection provides simultaneous activation to said first displaying and occluding members.

4. The display apparatus recited in claim 3 wherein said occluding members include ferroelectric ceramic layers.

5. The display apparatus recited in claim 4 wherein said displaying members include neon gas-filled lamps configured in the shape of the image to be displayed.

6. The display apparatus recited in claim 5 wherein said display apparatus is removably connected to a pair of glasses.

7. A display apparatus for emitting light to a viewer and for simultaneously blocking the direct rays of light from the vision of one who is positioned opposite the viewer while retaining substantially normal vision of the one so oppositely positioned, said display apparatus comprising:
   a light-emitting member, responsive to a first electrical activation signal having a frequency, for providing said light;
   a light-occluding member, responsive to a second electrical activation signal having the same frequency as the first electrical activation signal, disposed adjacent that side of said light-emitting member which is opposite said viewer; and
   electrical activating means electrically connected to said light-emitting member and to said light-occluding member for simultaneously providing said first and second electrical activation signals to said light-emitting member and said light-occluding member, respectively, so that the direct rays of light from said light-emitting member are occluded from said one positioned opposite said viewer, but further so that the otherwise normal vision of said one is substantially retained.

8. An apparatus as recited in claim 7, wherein:
   said light-occluding member includes a frequency responsive liquid crystal member.

9. An optical device for illuminating a subject to be seen by a viewer, comprising:
   illuminating means for lighting said subject;
   blocking means associated with said illuminating means between said illuminating means and said viewer for inhibiting said viewer's perception of said illuminating means; and
   electrical activating means associated with said illuminating means and said blocking means for periodically electrically activating said illuminating means and for simultaneously periodically electrically activating said blocking means for blocking said activated illuminating means from said viewer's vision.

10. The optical device recited in claim 9 wherein said illuminating means includes:
    a first lighting member for providing illumination to said subject; and
    a second lighting member associated with said first lighting member for providing illumination to said subject at a time different from the time said first member provides illumination.

11. The optical device recited in claim 10 wherein said blocking means includes:
    a first obscuring member associated with said first lighting member for preventing said viewer from seeing said first lighting member during the time said first lighting member provides illumination; and
    a second obscuring member associated with said second lighting member for preventing said viewer from seeing said second lighting member during the time said second lighting member provides illumination.

12. The optical device recited in claim 11 further comprising:
    a fiber optic member connected to said illuminating means on the side opposite said blocking means.

13. An optical device for illuminating a subject which is located at a first end of said device so that the subject may be observed by a viewer located at a second end of said device, said device comprising:
    a fiber optic member having a viewer end and a subject end;
    illuminating means for lighting said subject, said illuminating means including:
       a first lighting member disposed adjacent a first portion of said viewer end of said fiber optic member; and
       a second lighting member disposed adjacent a second portion of said viewer end of said fiber optic member;
    blocking means for occluding the direct light from said illuminating means when said illuminating means is activated to light said subject, said blocking means including:
       a first obscuring member, disposed adjacent said first lighting member opposite said fiber optic member, for preventing said viewer from seeing said first lighting member during the time said first lighting member provides illumination; and
       a second obscuring member, disposed adjacent said second lighting member opposite said fiber optic member, for preventing said viewer from seeing said second lighting member during the time said second lighting member provides illumination; and
    electrical activating means electrically associated with said illuminating means and said blocking means for alternately periodically electrically activating said first lighting member simultaneously with said first obscuring member and then said second lighting member simultaneously with said second obscuring member so the viewer can first see through said second lighting member and second obscuring member that portion of said subject lighted by said first lighting member and can next see through said first lighting member and first obscuring member that portion of said subject lighted by said second lighting member.

14. A headgear for displaying images to a viewer at substantially the eye level of a wearer of said headgear, while the wearer retains substantially normal vision therethrough, comprising:
    a support member for attaching said headgear to said wearer's head;
    a display member connected to said support member in overlay association with said wearer's eyes for projecting said images to said viewer, said display member including:
    a first right-triangular prism having a first hypotenuse side and a first perpendicular side adjoining said first hypotenuse side;
    a second right-triangular prism having a second hypotenuse side and a second perpendicular side adjoining said second hypotenuse side, said second hypotenuse side being connected to said first prism adjacent said first hypotenuse side so that said second perpendicular side is opposite said first perpendicular side;
    a third right-triangular prism having a third hypotenuse side and a third perpendicular side adjoining said third hypotenuse side, said third perpendicular side connected to said second perpendicular side for placing said third hypotenuse side in parallel relationship to said connected first and second hypotenuse sides; and a first image member associated with said third hypotenuse side of said third right-triangular prism for providing a first image to be projected by said display member to said viewer so that said wearer retains substantially normal vision.

15. The headgear as recited in claim 14 wherein:

said display member further includes:

a fourth right-triangular prism having a fourth hypotenuse side and a fourth perpendicular side adjoining said fourth hypotenuse side; and said headgear further comprises:

a second image member associated with said first perpendicular side for providing a second image to be projected by said display member to said viewer so that said wearer retains substantially normal vision;

a third image member disposed adjacent said second image means, and associated with said fourth perpendicular side of said fourth right-triangular prism so that said fourth hypotenuse is perpendicular to said joined first and second hypotenuse sides, for providing a third image to be projected by said display member to said viewer so that said viewer retains substantially normal vision; and a fourth image member associated with said fourth hypotenuse side of said fourth right-triangular prism for providing a fourth image to be projected by said display member to said viewer so that said wearer retains substantially normal vision.

16. The headgear as recited in claim 15 further comprising means for illuminating said image members.

* * * * *